Aug. 10, 1965  L. I. GRABLE ETAL  3,199,891
WHEELBARROW HAVING A RESILIENTLY MOUNTED WHEEL
Filed Sept. 18, 1962
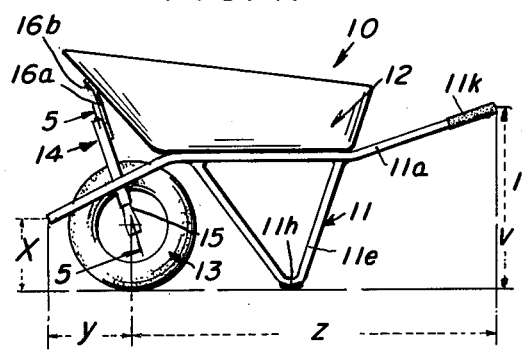
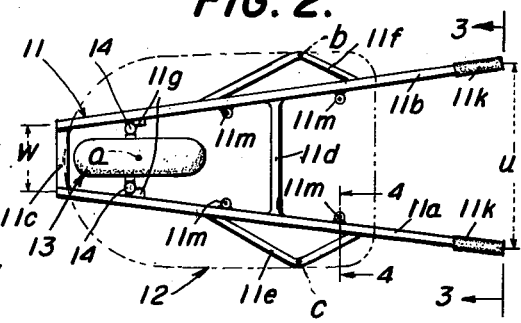
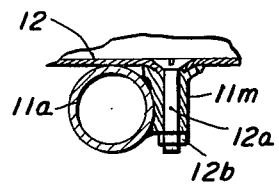
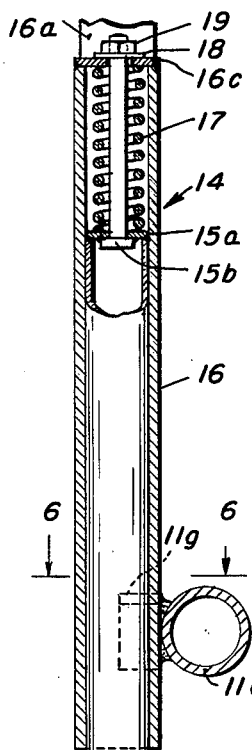
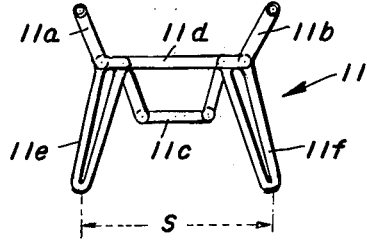
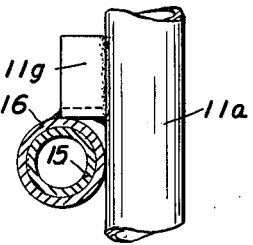
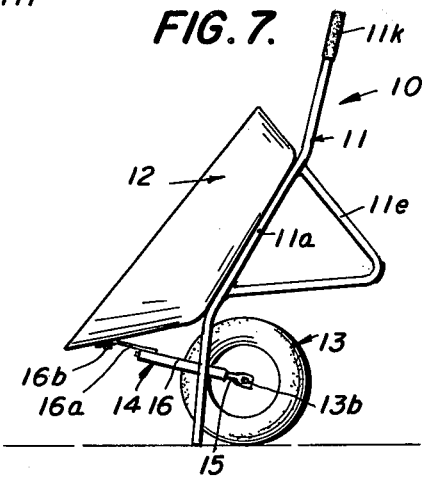
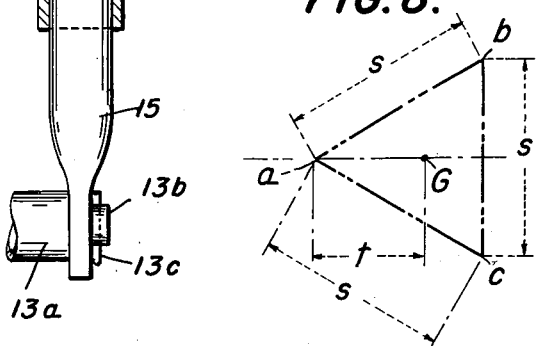
INVENTORS
Lawrence I. Grable
Gilbert W. Grable
Donald L. Grable

3,199,891
WHEELBARROW HAVING A RESILIENTLY MOUNTED WHEEL
Lawrence I. Grable and Gilbert W. Grable, both of 12325 La Cadena Drive, Colton, Calif., and Donald L. Grable, 2937 Carl St., Riverside, Calif.
Filed Sept. 18, 1962, Ser. No. 224,297
2 Claims. (Cl. 280—47.31)

The present invention relates to an entirely new wheelbarrow frame in respect to incorporating therein:

(1) Compensating means for absorbing the shock upon both the operator of the wheelbarrow and on the wheelbarrow itself while moving a load across an uneven surface or upon striking an obstacle with the wheel.

(2) Reducing the overall length of the wheelbarrow frame by moving the operator forward so that he is at the minimum distance from the back of the tray for efficient operation, thereby greatly increasing its stability and maneuverability, allowing its use in areas of very small size, and odd shapes, due to its extremely short turning radius.

(3) Ground supports which provide maximum support against overturning or tipping when supporting the wheelbarrow, and also act as a dead man control to correct operator failure.

(4) The location and form of the dump bar.

As is well known in the art, a conventional wheelbarrow frame comprises two strong, rigid, longitudinal members which digress from an overall width of approximately 9" at the wheel end to an overall width of approximately 24" at the other or handgrip end; to the upper side of these frame members, just behind the wheel, sufficiently to give operating clearance for the wheel, is attached a tray for the purpose of holding material which it is desired to transport from one location to another; to the lower side of each of the members directly under the end of the tray farthest from the wheel is attached a support to hold the frame members together and thereby said tray, a suitable distance from the surface that the supports and the wheel rest upon. The supports are tied together by cross-bracing and are bolted to the frame.

From the supports the longitudinal frame members extend out from the tray opposite to the wheel to become handgrips by which the operator may raise the load, and, the supports from the supporting surface allowing the weight of the barrow and the load to rest on the wheel at one end and on the operator's hands on the other end. From this position the operator may move the wheelbarrow either forward (which is the normal direction of travel), or backward by pushing or pulling on the handgrips.

In operation, the wheelbarrow gives a mechanical advantage in direct proportion to the distance from the center of the wheel to the center of the total weight to be moved, and, the distance from the center of the wheel to the handgrips used by the operator, when traveling on a flat hard surface where no obstacles are present.

However, despite the foregoing and other advantages of conventional wheelbarrows, they are also subject to serious disadvantages in that the wheelbarrow is prone to overturn at the slightest unbalance both when traveling or resting on its supports. The supports are only a matter of approximately 18" wide, or 9" each side of the longitudinal center line of the wheelbarrow. This provides a 3-point support for the wheelbarrow in the shape of a triangle 18" wide at the support and approximately 36" long to the center line of the wheel. The tray of the wheelbarrow is semi-rectangular, approximately 26" wide by 36" long by approximately 17" from the bottom of the tray to the ground. The average load on the contractors' barrow is approximately 400 pounds.

Conventional wheelbarrows today are designed so that approximately 80% of the load is on the wheel and 20% on the operator. This places the center of gravity at a point approximately 12" behind the center line of the wheel on the longitudinal center line of the wheelbarrow which is at right angles to the center line of the axle.

The three points of support when the wheelbarrow is at rest form an isosceles triangle 18" wide at the back of the tray with sides approximately 36" long and the apex being at the center line of the wheel where its periphery contacts the supporting surface. The center of gravity being located on the longitudinal center line of the wheelbarrow approximately 12" from the apex of the triangle provides a base with approximately 3" from the center of gravity to the point of overturning at the level of the supporting surface, with the center of gravity of the mass located approximately 24" above the level of support when the wheelbarrow is at rest on the supporting surface.

A shift of approximately 3" by the center of gravity due to tipping sideways will overturn the wheelbarrow. This necessitates the use of great care in loading and unloading conventional wheelbarrows, and is the cause of substantial losses in spilled material and clean-up labor after an accident. It is common practice for the operator to hold the wheelbarrow when loading from the spout of a mixer truck to prevent overturning of the wheelbarrow.

The overturning moment of such a big load resting that high above the ground on such a small base is so slight that given even a small start, it is out of control of the operator and the entire load is spilled.

It is further at a disadvantage in that the overall length of the conventional wheelbarrow frame is approximately 66" long, the handgrips which are spaced approximately 24" apart, are approximately 30" from the support, and the back of the tray, to provide leg room for the operator, with the result that to turn through a narrow door from a narrow passageway is impossible, there existing in effect, a rectangle 26" wide by 52" long which must clear the corner of the door facing, of the room, and the opposite wall of the passageway while remaining flat in relation to the floor. The long turning radius of the wheelbarrow makes it awkward and unwieldly to use in confined areas.

Another disadvantage of the conventional wheelbarrow is found in the rest supports and cross-bracing which are bolted to the wheelbarrow frame. The rest supports are placed at the back of the tray vertically under the load in relation to the longitudinal center line of the wheelbarrow so that any condition which causes the load to be carried on the wheel and one support immediately creates a side thrust on that support equal to approximately one half of the total load, and if it were not for substantial crossbracing, the supports would collapse from the magnitude of the side thrust. These cross-braces limit the area of movement for the operator's legs to the extent that when the wheel of the wheelbarrow unexpectedly strikes an obstacle while traveling with a load causing a sudden unexpected deceleration, or overturning reaction of the wheelbarrow, it often causes the operator's shin bone to come into violent contact with the cross-bracing, resulting in painful injury to the operator's leg.

Another disadvantage of the conventional wheelbarrow is that the handgrips which when traveling, are either parallel to or at a slight angle up from the surface over which the wheelbarrow travels. This surface is usually rough and covered with various obstacles of different magnitude up to some which are so great that further travel is impossible until the obstacle has been removed.

When the operator lifts the load by raising the handgrips of the wheelbarrow frame with his hands preparatory to traveling with the load, but before starting to move, the line of force is approximately perpendicular to the handgrips on the wheelbarrow and to the surface over which the wheelbarrow is to travel. Therefore, the line of force is approximately straight through the shoulder, elbow and wrist to the hand and handgrip. Upon starting to move, however, the line of force changes drastically and the total force is greatly enlarged. The hand of the operator must not only sustain the impact and the downward thrust of the unsprung load, but must also grip the handgrips of the wheelbarrow sufficiently strong to prevent the hand sliding along the handgrips toward the tray of the wheelbarrow when the operator applies the force necessary to move the wheelbarrow across the surface over which it travels. It is also necessary for the operator to lean toward the direction of travel in order to supply sufficient power to move the wheelbarrow. This act by the operator results in a change in the line of reaction against his body so that his wrist must bend to an angle to transfer the total load from his shoulder to the handle of the wheelbarrow when traveling from one place to another. This creates a considerable strain on his wrist, and, results in an awkward position from which to react to any unexpected unbalance which may occur to the wheelbarrow. This lack of control often allows the wheelbarrow to tip, or overturn completely with a partial or complete loss of the load.

Another major disadvantage of the conventional wheelbarrow resides in the position of the handgrips in relation to the tray when traveling up an inclined surface, a very common condition in the use of wheelbarrows especially in commercial use where ramps are used to transfer material from one level to another and is particularly important when the material handled is liquid or semi-liquid as wet cement or wet plaster that is being put in place in construction work.

The elevation of the front end of the wheelbarrow in going up a ramp, or incline, creates a major increase in the operator-supported load and at the same time greatly increases the stress on the operator's wrists due to the fact that matertial flows to the back of the tray, and, the handgrips form an extremely acute angle with the operator's arm which must be compensated for by the operator's wrists. This cramping of the operator's wrists while at the same time materially increasing his load, greatly decreases his efficiency by reducing the load he can transport, and his control over the stability of the wheelbarrow.

Still another disadvantage of the conventional wheelbarrow is when dumping the wheelbarrow (which is usually accomplished by raising the handgrips), by allowing the frame and tray of the wheelbarrow to rotate around the axle in the wheel until the tray reaches an angle of approximately 90 degrees from its normal position, allowing the load to slide out of the end of the tray in front of the wheel by gravity.

The dumping of the material from the tray occurs before the front end of the frame contacts the support surface, resulting in a violent reaction which causes the wheelbarrow wheel to roll backwards, striking the feet and legs of the operator while at the same time causing the load to fall short of the intended position resulting in loss of material and additional labor to correct the mistake.

Another disadvantage of the conventional wheelbarrow is the stiff, heavy frame mounted rigidly to the wheel, which, in spite of the pneumatic tire, frequently transmits heavy shock loads through the hands and arms to the body of the operator causing lack of control and undue fatigue in the operator.

Another serious disadvantage of the conventional wheelbarrow is the lack of support under the center of the tray by the frame which allows the tray to sag between the longitudinal members, and thereby allows the top of the sides of the tray to pull in towards the center to give a cylindrical form to the tray destroying its usefulness.

The foregoing and various other disadvantages of conventional wheelbarrow frames have in the past prevented such wheelbarrows from operating entirely satisfactorily, a primary object of the present invention being to provide a wheelbarrow frame which eliminates such disadvantages and which insures a greatly enlarged field of service for wheelbarrows at a material reduction in cost.

More particularly, another object of the present invention is to provide a yieldable frame between the wheel and the load of the wheelbarrow with the means for limiting the extent to which such yieldable frame may yield. The force required to produce yielding of the yieldable frame to its maximum extent, is slightly greater than the force required to absorb the maximum impact encountered in wheelbarrow operation. This greatly reduces the shock to the wheel, the operator and the wheelbarrow when traveling over rough and uneven surfaces, loaded. This is an important feature.

Another important object of the present invention is to provide a yieldable connection between the wheel and the frame of the wheelbarrow with the means for limiting the extent to which such yieldable connection may yield. The force required to produce yielding of the yieldable connection to its maximum extent is slightly greater than the force required to absorb the maximum impact encountered in wheelbarrow operation. This greatly reduces the shock to the wheel, the operator and the wheelbarrow when traveling over rough and uneven surfaces with a load. This is a most important feature.

Another object is to provide a frame which includes a compression spring interposed between the wheel and the wheelbarrow frame and biasing the wheel and the wheelbarrow frame apart.

Another and preferred object of the invention is to use a coil spring as above described, but having two units each with one half the capacity of the single unit which are placed one at each end of the axle that supports the load and transfers said load to a wheel which is placed between the units with the axle passing through the wheel in the usual manner. These units are comprised of an outer tube which is inclined at the top towards the front of the wheelbarrow and is attached to and is a part of the frame of the wheelbarrow and an inner tube which moves axially within the outer tube independently of each other, supporting a spring in the outer tube, and thereby the frame on each end of the axle which rests on the bearing of the wheel; said inner tube being attached to said outer tube by a bolt, through the center hole of the coil spring, limiting the amount of travel of said inner tube in relation to said outer tube on the recoil.

When the hand-grips are raised to move the wheelbarrow, the shock absorber units are inclined still further from the vertical and the sliding friction between the outer tube and the inner tube is increased, controlling and limiting the spring action both up and down, serving the same purpose as a double acting shock absorber on an automobile.

The supports have also been moved toward the wheel from the back of the tray so that the distance from the contact point of the supports and the point of support at the center line of the wheel are all approximately equidistant from the center of gravity of the loaded wheelbarrow and from each other, thereby making the overturning approximately the same both sideways and endways. This not only increases the stability of the wheelbarrow sideways by approximately 300%, but also permits the shortening of the distance between the handgrips and the tray permitting the operator leg room under the wheelbarrow and increasing the stability by approximately the same amount when being moved by the operator, thereby eliminating practically all spillage or overturning of the load while in transit. This is a very important improvement removing the need for the operator to steady the wheelbarrow when loading or when mixing material in the wheelbarrow tray with a hoe or shovel.

It also automatically acts as a dead man control by preventing the overturning of the wheelbarrow due to operator error or accident. The widespread legs prevent overturning when the wheelbarrow is dropped.

Great strength of the supports is also provided without the use of cross-bracing, and due to the lifting action when moving the leg from the angle position to the vertical position, and the fact that the load capacity of the support is increased as it travels through the angle to the vertical, the enormous side thrust on the supports of the conventional wheelbarrow is not present in the wheelbarrow here presented, and the force necessary to overturn the wheelbarrow when resting on the support, is greatly enlarged, which is an important feature.

Another object is to provide greater maneuverability and stability within the wheelbarrow while traveling from place to place, loaded.

In order to obtain greater stability with the wheelbarrow and to allow a shorter turning radius, the longitudinal members of the frame are shortened on the end away from the wheel and the tray to an overall length of approximately 53 inches so as to locate the handgrips at an overall distance, from the back of the tray, of 12 to 18 inches which with the removal of the cross-braces on the supports (herein above described) allows the operator to be directly behind the tray with a completely clear and unobstructed area all the way to the wheel itself for the operator's feet and legs, while at the same time broadening the base of support at the handgrips in relation to the distance to the wheel (the third point of support when the wheelbarrow is moving). This is a very important feature.

Further control by the operator is obtained by angling the ends of the longitudinal members up from the tray to the end of the handgrips. This places the handgrips lengthwise in a vertical plane that is approximately at right angles to the line of the resultant force obtained from the load sustaining force and the force required to move the wheelbarrow forward. In this position there is no tendency for the operator's hand to slip forward on the handgrips when the wheelbarrow is moved, and the line of force from the handgrips to the shoulder of the operator is approximately straight, eliminating excessive flexing of the operator's wrists, resulting in less fatigue to the operator, and far more control over the wheelbarrow. This is an important feature, especially when the wheelbarrow is moved up an inclined ramp.

The operator's efficiency and comfort are still further increased by the covering of the handgrips with a plastic material which has a rough but not abrasive surface that also acts as an insulator against temperature extremes which in hot weather, particularly, create a terrific problem. This is a very important feature.

Another object is to overcome the faults present in conventional wheelbarrows when the operator dumps it by raising the handgrips of the wheelbarrow allowing the load to discharge out over the front lip of the tray by gravity, hereinabove referred to.

The front end of the frame is positioned to permit the load to transfer from the wheel to the bar at the point where the front lip of the tray is approximately parallel to the ground and the center of gravity of the load is balanced over the front end of the frame. The smooth transfer from the wheel to the front end of the frame without operator effort, and, the wide base provided by the bar, with the handgrips directly at the outside top corners of the load at shoulder level, give absolute control to the operator without undue effort. This is a feature of greatest importance.

Another object is to overcome the distortion of the tray between the longitudinal members. This is accomplished by placing a cross-member of heavy pipe between the said longitudinal members with end fastened to one member and the other end fastened to the other member so as to support the center of the tray. This is very important to the life of the tray.

The foregoing objects, advantages and features of the present invention, together with various other objects, advantages and features thereof which will become apparent, may be attained with the exemplary embodiments of the invention which are illustrated in the accompanying drawing and which are described in detail hereinafter.

Referring to the drawing:

FIG. 1 is a side elevation of a conventional wheelbarrow in which the frame of the present invention has been incorporated.

FIG. 2 is a bottom view of the invention showing the preferred embodiment of the present invention utilized in conjunction with a conventional wheel and tray.

FIG. 3 is a back elevation of the present invention showing the relationship of the support members 11f and 11e to the side members 11a and 11b of the frame.

FIG. 4 is a fragmentary view partially in section showing the method of anchoring the tray to the present invention.

FIG. 5 is an enlarged fragmentary, sectional view, showing one of the shock absorber units of the preferred embodiment of the present invention in conjunction with the wheel hub and the axle extension of a conventional wheelbarrow.

FIG. 6 is a fragmentary, sectional view showing the method of attaching the shock absorber unit to the side members of the frame.

FIG. 7 is a side elevation of the present invention incorporating the wheels and tray of the conventional wheelbarrow.

FIG. 8 is a diagram showing the relationship of the center of gravity of the wheelbarrow relative to the ground contact points.

Referring particularly to FIG. 1 of the drawing.

Illustrated therein is a side elevation of a wheelbarrow incorporating the present invention. The numeral 10 designates a wheelbarrow generally.

11, the wheelbarrow frame, which is the present invention.

12, a wheelbarrow tray generally.

13, wheel sub-assembly generally.

14, shock absorber members of the frame assembly generally.

11a, is one of two identical side frame members.

11e, is one of two identical frame support members.

11h, is one of two identical frame support wear plates.

11k, is one of two identical handgrip sheating on 11a and 11b.

16a, is one of two identical brackets attaching shock absorber units 14 to tray 12.

16b, is one of two identical bolts with nuts used to attach brackets 16a to tray 12.

14, is one of two identical shock absorber tubes welded to the frame at the bottom end and attached to the tray by bracket 16a.

15, is one of two identical inner tubes of 14 attached to the wheel sub-assembly 13.

Illustrated in FIG. 8 is an equilateral triangle a, b, c, with the point G being equidistant from each of the points a, b, c, and from the sides s. Point G represents the center of gravity of the loaded wheelbarrow. Point a represents the point of contact of the wheel 13 with the ground. Point b represents the contact point of the right support 11b on the ground, and point c represents the contact point of left support 11a on the ground. Reference letter s represents any side of the equilateral triangle formed by a, b, c. Reference letter t represents the relationship of G to a in terms of s.

To obtain FIG. 8, take the width of the proposed tray as the base of an equilateral triangle. Let this triangle represent the three support points of the proposed wheelbarrow (the contact point of the wheel with ground at the front and the contact point at ground of each of the side supports). Draw a line from the midpoint of the base line to bisect the angle opposite the base line, or the apex angle of the triangle, on the line drawn from the base line to the apex of the triangle. Take a distance from the base line equal to ⅓ of the distance from the base line to the apex of the triangle. This point is the optimum location for the center of gravity of the loaded wheelbarrow, at rest, to secure maximum efficiency and stability with the minimum of operator effort in every phase of operation encountered in the use of a wheelbarrow.

Using the length of a side of the triangle as a common factor, the other dimensions may be obtained as follows:
Let $s$ equal one side of the triangle .557$s$ equals T If $s$ equals 24 inches then $.557 \times 24$ equals T, or 13,368 inches equals T The distance from the center line of the wheel to the center point of gravity is measured in the same horizontal plane. The dimensions of $y$, $z$, $w$ and $u$ are also measured in the horizontal plane as shown in FIG. 1 and FIG. 2. $x$ and $v$ in FIG. 1 are measured in the vertical plane as shown.

Referring to FIG. 1, the following have been found to be preferable values for $v$, $x$, $y$ and $z$ in terms of $s$:

$v$ equals .958$s$
$x$ equals .34$s$
$y$ equals .4$s$
$z$ equals 1.875$s$

Referring to FIG. 2, the basic equilateral triangle (see FIG. 8) is shown at $a$ (contact point of wheel on ground) and $b$ and $c$ (contact point of supports on ground) showing the relationship of the tray 12 to the three points of support.

The front frame tie bar 11$c$ welded to side members 11$a$ and 11$b$ with a width of W, .32$s$, at the frame tie bar diverge to a width of $u$ equals $s$, at the outside end of the handgrips 11$k$ on side members 11$a$ and 11$b$. The center tie bar, 11$d$, is welded to the side members 11$a$ and 11$b$ so as to support the tray 12 at the center of its bottom. The lugs 11$m$ are the anchors to which the tray 12 is bolted to the frame members 11$a$ and 11$b$. The shock absorbers 14 are welded to the side members 11$a$ and 11$b$ and to the connecting angles 11$g$.

Referring to FIG. 3, an end elevation of the frame 11 from the back or handgrip end showing the relationship of the supports 11$e$ and 11$f$ at the ground, $s$ (FIG. 8), to the side members 11$a$ and 11$b$ and the tie members 11$c$ and 11$d$. The object is to provide for greater stability in the wheelbarrow when resting upon its supports. In order to obtain greater stability when the wheelbarrow is at rest upon its supports, the supports have been spread apart at the bottom at an angle of 20 degrees from the vertical on each side and made into an integral part of the frame by welding them permanently to the longitudinal members.

Referring to FIG. 4, the tray 12 is fastened to the frame by the bolt 12$a$ through the lug 11$m$ welded to the side members of the frame 11$a$ and is secured by the nut, 12$b$.

Referring to FIG. 5, the shock absorbers 14 are comprised of an outer tube 16 to which is welded a bracket 16$a$ (to attach to tray 12) and a closure 16$c$ at the top end, and a connecting angle 11$g$ and side member 11$a$ at the bottom end. The inner tube 15 has a closure 15$a$ with a bolt 15$b$ welded to the top end and a hole for the axle extension 13$b$ at the bottom end. The spring 17 is placed around the bolt 15$b$ and inserted in the outer tube 16 so that the bolt 15$b$ extends through the end closure 16$c$ where it is secured by the washer 18 and the nut 19.

The inner tube 15 is attached to the wheel by inserting the axle extension 13$b$ through the axle hole in tube 15 until it engages with wheel hub 13$a$ and is secured by cotter pin 13$c$.

In operation the load on outer tube 16 compresses the spring 17 in proportion to the load, said compression being limited by the spring being compressed to a solid tube; the spring constant of this being large as compared to the loaded wheelbarrow so that the wheelbarrow cannot override the spring so as to allow impact to occur between the wheel and the wheelbarrow frame, even when the wheel strikes an obstacle while moving.

Associated with the spring is a stop means for limiting maximum compression of the spring to a fraction of an inch, preferably less than approximately one inch. Thus, the tendency of the wheelbarrow to bounce or float when traveling over uneven surfaces or obstacles is not excessive if the maximum travel of the spring is controlled, which is an important feature. The inner tube 15 moves axially in the outer tube 16 and the recoil of the spring is limited by the bolt 15$b$. When the wheel strikes an object on either side of the wheel, the spring on that side compresses, allowing the wheel to tilt instead of the entire barrow with its load, thereby greatly enlarging the ability of the operator to prevent overturning of the load. This is a very important improvement. In order to prevent the springs next above referred to, from interfering with the proper operation of the wheelbarrow, above referred to, they are each calibrated to a load capacity of approximately 350 pounds, closed pressure, approximately one and one half inch maximum travel, approximately two and one half inches overall length. These are critical proportions when applied to a wheelbarrow up to 4 to 5 cubic feet capacity.

The shock absorber unit, FIG. 5, is mounted on the frame at an angle so that the wheel is behind the top of the unit when it is fastened to the front end of the tray. Raising the hand-grips to move the wheelbarrow serves to further increase the angle of the unit away from the vertical so that the inner tube when traveling, slides back and forth inside the outer tube; the sliding friction of the tubes under load controls the speed and amount of the reaction, acting as double acting shock absorbers.

Referring to FIG. 6, the connecting angle 11$g$ is welded to the side member 11$a$ and to the outer tube 16 to make the shock absorber 14 an integral member of the frame 11.

FIG. 7 illustrates the method of transferring the load on the wheel 13 to the frame 11 while the load in the wheelbarrow is still on the lip of the tray 12. The front tie bar on the new wheelbarrow frame here presented for consideration, is approximately 9 inches long and 1 to 1½ inches in diameter. It serves to tie the wheel end of the longitudinal members together and is positioned so that when the lip of the tray is approximately parallel to the supporting surface the front tie bar and the periphery of the wheel are each in contact with said supporting surface thereby preventing a backward movement of the wheelbarrow as a result of the reaction from discharging the load forward over the lip of the tray, while at the same time avoiding the necessity of the operator having to raise the load and the wheelbarrow to bring the center of gravity over the ground contact point of the front end of the frame as would be the case if the front end of the frame 11 were longer.

Although we have disclosed an exemplary embodiment of our invention herein for purposes of illustration, it will be understood that a flexible frame without springs but with the amount of flexing limited would be comparable to, but not as desirable as the embodiment here disclosed.

It will be understood that various changes, modifications, and substitutions may be incorporated therein without departing from the spirit of the invention.

We claim as our invention:
1. For a wheelbarrow, a frame comprising a rigid center section of welded tubular steel comprised of bent side frame members each having a substantially horizontal center section; a center tie bar welded at each end to one of said side frame members at their center sections in a horizontal plane parallel to the ground; a ground engaging support welded to the center section of each said side frame member and angled out from the vertical at the bottom on an angle of 20 degrees; four recessed tray anchor lugs; two of said tray anchor lugs welded to the center section of each said side frame member at the front and back of said center section; a tray having anchoring holes therein; the area adjacent to said anchoring holes deformed outwardly to enter the recesses in the top of the anchor lugs, and said tray bolted to said anchor lugs by anchor bolts whose heads are flush with the inside bottom surface of the tray; said side frame members extending rearwardly and upwardly from the rear of said center section of said side frame members to provide handle portions which are substantially at right angles to the force resulting from the down-thrust of the load and the resistance of the wheelbarrow to forward motion; said side frame members provided with a forward portion extending forwardly and downwardly from said center section of each of said side frame members; said forward portions joined adjacent their front end by a front tie bar; adjacent the mid-point on the inside of each said forward portions there is welded a tubular tray support member, each said tubular tray support member extending forwardly and upwardly from its connection with said forward portions and secured to the top of said tray; each said tubular tray support member extending below and rearwardly of its connection with said forward portions; each said tubular trays support member provided with an open lower end portion and a tubular axle carrying member telescoped within and extending beyond said open lower end portions of said tubular tray support members; a wheel carrying axle attached to and extending between the lower ends of said tubular axle carrying members; and spring means positioned within said tubular tray support members for resiliently supporting said tubular axle carrying members.

2. A wheelbarrow frame as defined in claim 1 wherein each said tubular tray supports include a bracket which serves as a closure and has a hole located over the center of the upper end of each of said tubular support members to receive a bolt; said axle carrying members each having a closed upper end provided with a central aperture therein, said spring means positioned between the said bracket and said disclosed upper end of each said axle carrying member; and a bolt extending through each said hole in said bracket, through said spring means and through said aperture in each said closed upper ends of said axle carrying members.

References Cited by the Examiner
UNITED STATES PATENTS

| | | | |
|---|---|---|---|
| 349,681 | 9/86 | Benjamin | 280—47.31 |
| 1,180,009 | 4/16 | Chein | 280—47.31 |
| 1,300,186 | 4/19 | Montgomery | 280—47.3 X |
| 2,247,083 | 6/41 | Garlinghouse | 280—47.31 X |

FOREIGN PATENTS

| | | |
|---|---|---|
| 9,756 | 1891 | Great Britain. |
| 601,193 | 4/48 | Great Britain. |
| 654,802 | 6/51 | Great Britain. |
| 803,436 | 10/58 | Great Britain. |
| 808,004 | 1/59 | Great Britain. |

A. HARRY LEVY, *Primary Examiner.*